(12) United States Patent
Stinner

(10) Patent No.: US 12,028,704 B2
(45) Date of Patent: Jul. 2, 2024

(54) METHOD FOR THE ANONYMIZED TRANSMISSION OF SENSOR DATA OF A VEHICLE TO A VEHICLE-EXTERNAL RECEIVING UNIT, ANONYMIZING SYSTEM, MOTOR VEHICLE, AND VEHICLE-EXTERNAL RECEIVING UNIT

(71) Applicant: AUDI AG, Ingolstadt (DE)

(72) Inventor: Markus Stinner, Munich (DE)

(73) Assignee: AUDI AG, Ingolstadt (DE)

( * ) Notice: Subject to any disclaimer, the term of this patent is extended or adjusted under 35 U.S.C. 154(b) by 629 days.

(21) Appl. No.: 17/269,462

(22) PCT Filed: Nov. 11, 2019

(86) PCT No.: PCT/EP2019/080792
§ 371 (c)(1),
(2) Date: Feb. 18, 2021

(87) PCT Pub. No.: WO2020/108964
PCT Pub. Date: Jun. 4, 2020

(65) Prior Publication Data
US 2021/0258776 A1 Aug. 19, 2021

(30) Foreign Application Priority Data
Nov. 27, 2018 (DE) ............ 10 2018 220 307.5

(51) Int. Cl.
*H04W 12/04* (2021.01)
*G06F 21/55* (2013.01)
(Continued)

(52) U.S. Cl.
CPC ........ *H04W 12/02* (2013.01); *G06F 21/6254* (2013.01); *G07C 5/008* (2013.01); *H04W 4/44* (2018.02); *G06F 2221/2111* (2013.01)

(58) Field of Classification Search
CPC ......... G06F 21/6254; G06F 2221/2111; G07C 5/008; G07C 5/0841; G08C 17/02;
(Continued)

(56) References Cited

U.S. PATENT DOCUMENTS 11,009,602 B2  5/2021  Correia et al.
11,889,299 B2 * 1/2024  Ernst .................. H04W 4/44
(Continued)

FOREIGN PATENT DOCUMENTS

CN   103338436 A   10/2013
CN   103428688 A   12/2013
(Continued)

OTHER PUBLICATIONS

International Search Report and Written Opinion of the International Searching Authority directed to related International Patent Application No. PCT/EP2019/080792, mailed Feb. 19, 2020, with attached English-language translation; 27 pages.
(Continued)

*Primary Examiner* — Joseph P Hirl
*Assistant Examiner* — Thomas A Gyorfi
(74) *Attorney, Agent, or Firm* — Sterne, Kessler, Goldstein & Fox P.L.L.C.

(57) ABSTRACT

The present disclosure invention relates to a method for the anonymized transmission of sensor data of a vehicle to a vehicle-external receiving unit, to an anonymizing system, and to a receiving unit, the method including the following steps: determining the sensor data at a measurement location at a measurement time, determining a traffic density in an environment of the measurement location, determining an anonymized time and/or an anonymized location, calculating an anonymization probability of the vehicle, which results from the traffic density and the anonymized time and/or location, determining whether the anonymization
(Continued)

probability meets a predetermined anonymization condition, and if the anonymization condition is met, transmitting the sensor data to the external receiving unit, the anonymized time being indicated as a measurement time indication and/or the anonymized location being indicated as a measurement location indication.

10 Claims, 3 Drawing Sheets

(51) Int. Cl.
    *G06F 21/62*     (2013.01)
    *G07C 5/00*     (2006.01)
    *H04W 4/44*     (2018.01)
    *H04W 12/02*     (2009.01)

(58) Field of Classification Search
    CPC .. G08G 1/0133; G08G 1/0141; G08G 1/0112; G08G 1/096716; G08G 1/096758; G08G 1/096791; H04W 4/44; H04W 12/02; H04W 84/18
    See application file for complete search history.

(56) References Cited

U.S. PATENT DOCUMENTS

| | | | |
|---|---|---|---|
| 2007/0208496 A1* | 9/2007 | Downs | G08G 1/0133 701/117 |
| 2009/0143966 A1 | 6/2009 | Jacobson et al. | |
| 2015/0178999 A1 | 6/2015 | Smith et al. | |
| 2016/0028824 A1 | 1/2016 | Stenneth et al. | |
| 2017/0358204 A1 | 12/2017 | Modica et al. | |
| 2018/0122230 A1* | 5/2018 | Torgerson | G08G 1/16 |
| 2018/0173895 A1* | 6/2018 | Max | G06F 21/6254 |
| 2018/0319405 A1 | 11/2018 | Heinze et al. | |
| 2019/0042789 A1 | 2/2019 | Hartkopp et al. | |

FOREIGN PATENT DOCUMENTS

| | | | | |
|---|---|---|---|---|
| CN | 105745665 A | 7/2016 | | |
| CN | 105792207 A | 7/2016 | | |
| CN | 108569295 A | 9/2018 | | |
| CN | 108769926 A | 11/2018 | | |
| DE | 102010003247 A1 | 9/2011 | | |
| DE | 102011106295 A1 | 1/2012 | | |
| DE | 102016200759 A1 | 5/2017 | | |
| DE | 102015226650 A1 | 6/2017 | | |
| DE | 102016211352 A1 | 8/2017 | | |
| DE | 102016225287 A1 | 6/2018 | | |
| WO | WO-2014135279 A1 * | 9/2014 | | G06F 21/606 |

OTHER PUBLICATIONS

Written Opinion of the International Preliminary Examining Authority directed to related International Patent Application No. PCT/EP2019/080792, mailed Aug. 19, 2020, with attached English-language translation; 16 pages.

* cited by examiner

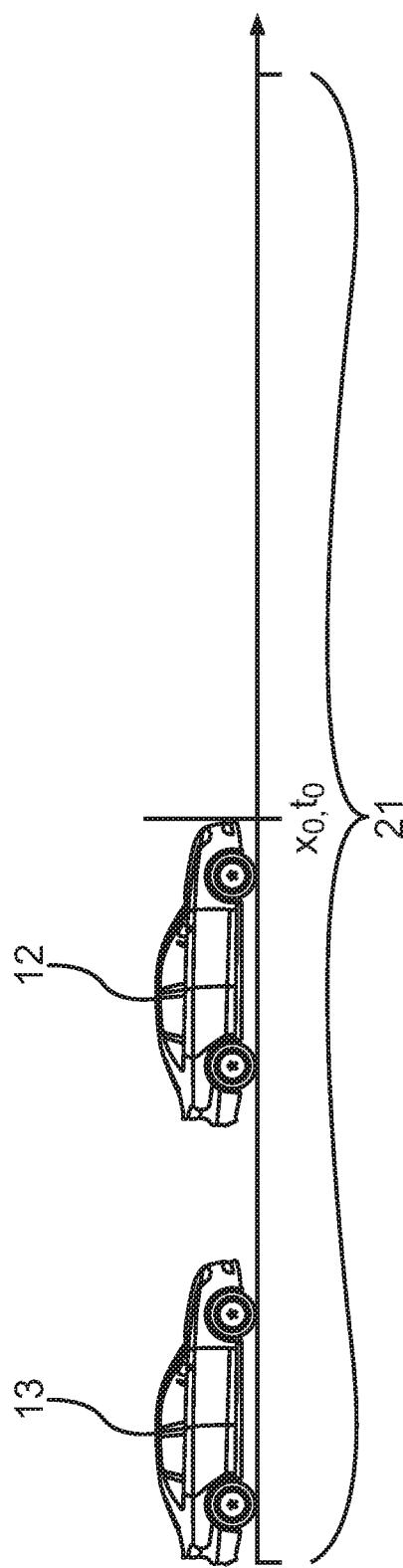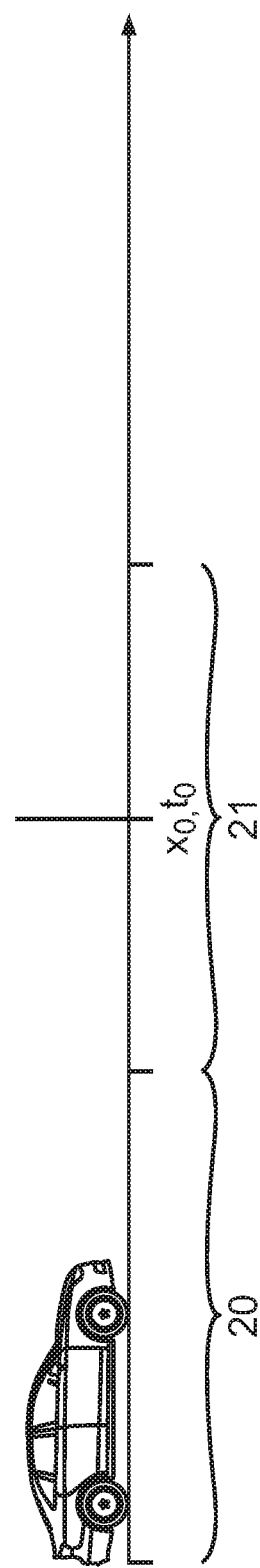

METHOD FOR THE ANONYMIZED TRANSMISSION OF SENSOR DATA OF A VEHICLE TO A VEHICLE-EXTERNAL RECEIVING UNIT, ANONYMIZING SYSTEM, MOTOR VEHICLE, AND VEHICLE-EXTERNAL RECEIVING UNIT

TECHNICAL FIELD

The present disclosure relates to a method for the anonymized transmission of sensor data of a vehicle to a vehicle-external receiving unit, anonymizing system, vehicle-external receiving unit, and motor vehicle.

BACKGROUND

For vehicle networking, it is advantageous if sensor data that are determined by one vehicle are made available to other vehicles. In order to ensure data protection for a driver, however, it is necessary to avoid drawing conclusions about the transmitting vehicle. An anonymization can avoid a personal reference of data.

DE 10 2015 226 650 A1 discloses a method for anonymized transmission of a first value of at least one driving parameter of a vehicle to an external data receiving unit. In the method, the first value for the driving parameter of the vehicle is determined. Further values for the driving parameters, which are transmitted from further vehicles to the vehicle, are received from the vehicle. A second value for the driving parameter is calculated from the first value and the further values in such a way that the first value cannot be reconstructed by the external data receiving unit. The second value is transmitted to the external data receiving unit.

DE 10 2010 003 247 A1 discloses a method for displaying at least one efficiency parameter of a vehicle, the at least one efficiency parameter being determined for a predetermined route and the at least one efficiency parameter being displayed in relation to at least one reference value, wherein the at least one reference value is assigned to this predetermined route.

DE 10 2016 211 352 A1 discloses a method for configuring mobile online services for use with a vehicle. It is provided that the method comprises the following steps: providing a configuration system which assigns data content to a data release class from a plurality of data release classes, providing a selection option for a user through the configuration system, through which the user can allow one or more mobile online services to use the data content of a data release class, selecting a data release class for the one or more mobile online services, and releasing the data content of the selected data release class for use by the respective mobile online service by the configuration system.

The disadvantage of current methods is that it is not the effects of the anonymization method but rather the anonymization measures that are assessed. Since no information is available about the environment, the anonymization measure cannot be assessed in terms of the probability of the anonymization being successful.

BRIEF DESCRIPTION OF THE DRAWINGS/FIGURES

FIG. 2a is a schematic representation of a determination of an anonymization probability according to an embodiment with an anonymized time.

FIG. 2b is a schematic representation of a determination of an anonymization probability according to the embodiment of FIG. 2a with an additionally anonymized location.

DETAILED DESCRIPTION

Figure 1:
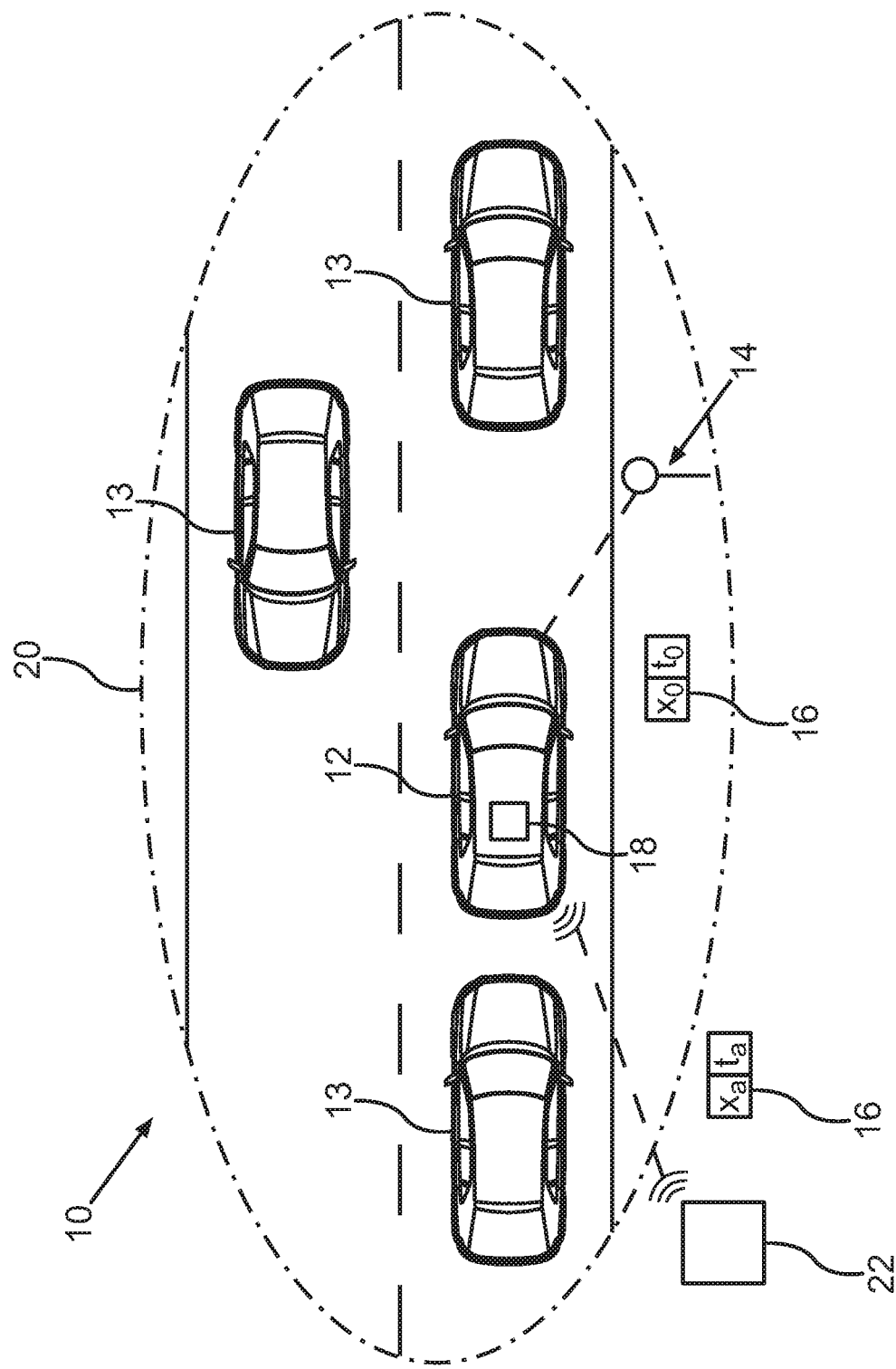
FIG. 1 is a schematic representation of an anonymizing system according to an embodiment.

The present disclosure is based on the object of providing an anonymization method for a vehicle.

The object is achieved by the subject matter of the independent claims. Advantageous developments of the various embodiments of the present disclosure are described by the dependent claims, the subsequent description, and the drawings.

The present disclosure is based on the knowledge that sensor data that can come from two different senders can no longer be unambiguously assigned to one sender.

The present disclosure provides a method for the anonymized transmission of sensor data of a vehicle to a vehicle-external receiving unit, in accordance with some embodiments. The sensor data are transmitted with a measurement time indication and/or with a measurement location indication. By way of a non-limiting example, sensor data, in addition to the actual measurement data, include the time and/or the location at which they were measured. Sensor data can be recorded by at least one sensor that can be located in the vehicle. For example, the at least one sensor can include at least one electrical, optical, and/or mechanical sensor, in particular a vehicle camera, a vehicle radar, laser sensors such as a lidar, and/or pressure-sensitive sensors in the shock absorbers that can detect road conditions. The vehicle-external receiving unit can be a server that can collect route information from a plurality of vehicles in order to evaluate it and make it available to all vehicles.

The method according to some embodiments includes determining the sensor data at a measurement location of the vehicle at a measurement time indication, determining a traffic density in the environment of the measurement location, and determining an anonymized time that lies within a predetermined time interval or a predetermined time around the measurement time, and/or determining an anonymized location that lies within a predetermined distance around the measurement location. By way of a non-limiting example, sensor data are recorded at a measurement time and a measurement location, which creates the actual measurement data and, in addition, the traffic density in the environment of the measurement location is determined. The traffic density can originate in this case, for example, from traffic information from a navigation system that is provided to the vehicle or the navigation device. The environment can, for example, be a road on which the vehicle is located or a district. A random anonymized time can then be defined within the predetermined time around the measurement time, and/or a reliable anonymized location can be established within a predetermined distance from the measurement location.

In some embodiments, the method further includes calculating an anonymization probability of the vehicle on the basis of the traffic density and the predetermined time on the one hand and/or on the basis of the traffic density and the predetermined distance on the other hand. On the basis of the known traffic density, it can be determined how likely it is that another vehicle could have generated the sensor data at the anonymized time and/or at the anonymized location. Correspondingly, a determination is carried out as to whether the anonymization probability meets a predetermined anonymization condition, and if the anonymization condition is met, a transmission of the sensor data to the external receiving unit is carried out, wherein the anonymized time is indicated as the measurement time indication rather than the actual measurement time and/or the anonymized location is indicated as the measurement location indication rather than the actual measurement location. By way of a non-limiting example, an anonymization probability is first calculated using the traffic density, i.e., the vehicles per time, and the predetermined time around the measurement time. The predetermined time, by way of a non-limiting example, can be a time interval that can have a length of 1 minute to 24 hours. By way of a non-limiting example, the anonymization probability can also be calculated on the basis of the traffic density and the predetermined distance around the measurement location. The distance can be a radial spatial region which can be a radius in a range from 1 meter to 2 kilometers around the measurement location, or it can be a corresponding distance on the road on which the vehicle is located. The anonymization probability can be determined by means of a statistical method and/or indicate a percentage probability of how many other vehicles could come from as potential sender of the sensor data because they were also in the environment according to the traffic density. The value of the anonymization probability can then be compared with a predetermined anonymization condition and it can be determined whether the anonymization probability meets the predetermined anonymization condition. The predetermined anonymization condition can be, for example, a probability value for the fact that at least a predetermined number of vehicles were present as potential senders, and the condition can be met if the anonymization probability is above this probability value. In particular, the predetermined anonymization condition can be met if the sensor data can have at least said probability value of greater than or equal to two different vehicles.

In some embodiments, if this anonymization condition is met, the sensor data can be transmitted to the external receiving unit, wherein the anonymized time is indicated in the sensor data as the measurement time indication and/or the anonymized location is indicated as the measurement location indication. If the anonymization condition is not met, provision can be made for the sensor data not to be transmitted and, for example, discarded, or provision can be made for the sensor data to be transmitted with renewed anonymization at a later time if the anonymization condition is then met.

The embodiments described herein have the advantage that sensor data can no longer be assigned to a specific vehicle, which improves anonymization. Furthermore, the method according to some embodiments provides information about the probability with which anonymization was achieved, and a statement can thus be made about the effects of the anonymization method.

The present disclosure also includes further embodiments, which offer additional advantages.

In some embodiments, the determination of the anonymized time is carried out on the basis of a random generator, wherein the random generator generates a value by means of a uniform distribution which lies within the predetermined time, and/or wherein the determination of the anonymized location is carried out on the basis of the random generator, wherein the random generator generates a value by means of a uniform distribution which lies within the predetermined distance. This means that the anonymized time and/or the anonymized location are determined randomly by means of a random generator, the random generator being able to generate a uniformly distributed random value within the predetermined time around the measurement time and/or within the predetermined distance from the measurement location. The random generator can be provided as a program or function in a vehicle computer. Accordingly, the anonymized value to be determined can have an evenly distributed probability, which makes it difficult to draw conclusions about the transmitting vehicle and thus improves the anonymization.

In some embodiments, the anonymization condition is met if the anonymization probability that the sensor data can also originate from a vehicle other than one's own vehicle due to the traffic density is greater than a threshold value. This means that sensor data that can originate from two or more vehicles can no longer be assigned to a vehicle and the anonymization condition is met if the probability for this case is greater than a threshold value. For example, the threshold value that the sensor data originate from at least two different vehicles can have a probability of greater than or equal to 99.9%. This ensures that there is a minimum number of potential senders. Accordingly, anonymization can be improved and ensured.

In some embodiments, calculation of the anonymization probability is carried out using a Poisson distribution. By way of a non-limiting example, a Poisson distribution is assumed for the calculation of the anonymization probability, with which the number of events, i.e., of vehicles that are within the predetermined time and/or within the predetermined distance or can enter these, can be modeled. For example, the Poisson distribution can be used to determine the probability that sensor data can originate from at least two vehicles that are within the predetermined distance and/or the predetermined time. Accordingly, a probability, in particular the anonymization probability, with which the sensor data can come from at least two different vehicles, can be better calculated and the anonymization can thus be improved.

In some embodiments, the predetermined time and/or the predetermined distance is selected depending on the sensor data and/or a data type of the sensor data. By way of a non-limiting example, the predetermined time and/or the predetermined distance with which the anonymized time and the anonymized location of the vehicle are determined can depend on which sensor the sensor data come from or which event is recorded by the sensor. For example, a vehicle camera can record an event, such as an accident, in which the measurement location indication can preferably match the measurement location. In this example, the predetermined distance with which the data is to be anonymized can be zero and the predetermined time can have a value other than zero, such as but not limited to a time interval of 10 minutes. As a result, a location information can be retained and anonymization can also be ensured by anonymizing the measurement time. It is therefore no longer possible to reconstruct when the vehicle was at the measurement location. However, provision can also be made for sensor data to be recorded by a sensor, the time component of which is to be retained and which can be independent of the current location, such as a current brightness at a specific time of day. In this case, for example, only the predetermined distance can be used for anonymization. However, it can also be the case that the sensor data are neither time nor location-critical and thus both the predetermined time and the predetermined distance can be used for anonymization. Depending on the type of data, the predetermined time can be, for example, in the range of seconds, minutes, or hours and the predetermined distance in the range of meters or kilometers. Accordingly, important parameters can be obtained in the sensor data and the sensor data can still be anonymized, which improves anonymization.

In some embodiments, the method further includes receiving the sensor data by the external receiving unit and removing transmission information that allows a conclusion about a sender from the sensor data. By way of a non-limiting example, the sensor data can be received by the external receiving unit, and then transmission information with which a sender can be identified can be removed from the sensor data. The transmission information can be, for example, a vehicle identification number, an IP address of the vehicle, and/or a MAC address. Accordingly, the transmission information can no longer be used to draw conclusions about the transmitting vehicle, which leads to improved anonymization of the sensor data. The data anonymized in this way can then, for example, be made available to an external provider for further processing of the sensor data without the latter being able to draw any conclusions about the vehicle from which the data originate.

In some embodiments, the method further includes the following steps: a determination by the external receiving unit as to whether at least two sets of sensor data are available for the environment and, if the determination is answered in the affirmative, provision of the two sets of sensor data. By way of a non-limiting example, it can be determined by the external receiving unit whether at least two data sets of sensor data are available at the external sensor unit for the environment of the measurement location in which the traffic density is also determined and, if this is the case, further processing of the sets is allowed by sensor data. This means that the external receiving unit can include a type of buffer which only releases the sensor data when at least two data sets are available. If only one set of sensor data is available, it can be provided that the external receiving unit waits for a predetermined period of time for further data sets, and if no further data sets arrive in this predetermined period of time, the external receiving unit can discard the individual set of sensor data. The predetermined period of time can be, for example, an hour or a day. Accordingly, an unambiguous assignment to a sender can be made more difficult.

In some embodiments, an anonymizing system for the anonymized transmission of sensor data to a vehicle-external receiving unit is also provided, including the receiving unit and at least one vehicle, wherein the at least one vehicle is configured to transmit the sensor data with a measurement time indication and/or with a measurement location indication, wherein the vehicle is configured to determine sensor data at a measurement location of the vehicle at a time to determine a traffic density in the environment of the measurement location, determine an anonymized time that lies within a predetermined time around the measurement time, and/or determine an anonymized location that lies within a predetermined distance around the measurement location. The vehicle is also configured to calculate on the one hand an anonymization probability of the vehicle on the basis of the traffic density and the predetermined time and/or on the other hand on the basis of the traffic density and the predetermined distance and to determine whether the anonymization probability meets a predetermined anonymization condition, and if this is met, determine the sensor data of the measurement time transmitted to the external receiving unit, wherein the anonymized time is indicated as the measurement time indication and/or the anonymized location is indicated as the measurement location indication.

This results in the same advantages and possible variations as with the method according to various embodiments as described herein.

In some embodiments, a motor vehicle is provided having a controller, which is designed to carry out the method according to various embodiments described herein. By way of a non-limiting example, the motor vehicle can be a passenger car, a truck, a passenger transport bus, and/or a motorcycle.

In some embodiments, a vehicle-external receiving unit is disclosed. The vehicle-external receiving unit is designed to receive sensor data, remove transmission information that allows conclusions to be drawn about a sender, and determine whether there are at least two sets of sensor data for the measurement location, in this case, to accept and process the two sets of sensor data. By way of a non-limiting example, the external receiving unit can remove transmission information from the received sensor data and the external receiving unit can only accept and process the sensor data when at least two sets of sensor data have been received, the received sensor data forming a set of sensor data. Accordingly, an improved anonymization can be carried out by removing the transmission information and at least two sets of sensor data are available. This means that an unambiguous assignment to a sender can be avoided.

The present disclosure also includes refinements of the method according to various_embodiments described herein, which include features such as those that were previously described in connection with the refinements of the motor vehicle according to various embodiments. For this reason, the corresponding refinements of the method are not described again herein.

The present disclosure also includes combinations of the features of the described embodiments.

Embodiments of the present disclosure are described below by way of example.

The embodiments explained in the following are preferred embodiments in which the described components of the embodiments each represent individual features which are to be considered to be independent of one another and which each further may also be supplemented by further features according to various embodiments as already described.

In the drawings, the same reference signs refer to functionally identical elements.

FIG. 1 is a schematic representation of an anonymizing system according to an embodiment. FIG. 1 is a schematic representation of an anonymizing system 10 according to a preferred embodiment. FIG. 1 shows a vehicle 12 that may be on a road with a plurality of other vehicles 13.

The embodiment shown in FIG. 1 can be based on the following situation by way of an example. The vehicle 12 is traveling on the road, and a sensor of the vehicle 12, which can for example be a camera of a driver assistance system, can measure an event, such as, in this embodiment, a new traffic sign 14, which can for example display a new speed limit. The measurement of the traffic sign 14 can be provided to the vehicle 12 by the camera in the form of sensor data 16, it being possible for the sensor data 16 to be recorded with a measurement time indication to and a measurement location indication $x_0$.

It can be provided that the sensor data 16 of the new traffic sign 14 should also be made available to other vehicles 13. However, it should not be possible to determine from which vehicle the sensor data 16 originate. In order to anonymize the sensor data 16, a controller 18 can be provided in the vehicle 12 which anonymizes the sensor data 16 before the transmission.

To this end, the controller 18 can determine a traffic density in the environment of the measurement location $x_0$, which can originate, for example, from traffic information from the navigation system, and can specify a density of vehicles per minute or per hour that are located on the same road. In addition, the controller 18 can determine an anonymized location $x_a$, which can lie within a predetermined distance 20 around the measurement location $x_0$. By way of a non-limiting example, however, an anonymized time $t_a$ can be determined, which can be around the measurement time $t_0$ within a predetermined time (not shown in FIG. 1).

In accordance with some embodiments, predetermined distance 20 and the predetermined time can be carried out depending on the type of sensor data and/or the data type of the sensor data. For example, a larger predetermined distance 20 and a longer predetermined time can be used in a current temperature measurement, which makes anonymization more likely. It can also be provided that, for example, in the case of sensor data 16 that originate from a camera, the measurement location $x_0$ can be more important than the measurement time $t_0$. It can then be provided that the predetermined distance 20 is zero meters and the anonymized location $x_a$ coincides with the measurement location $x_0$ and only the time is anonymized. In FIG. 1, only an anonymization of the location $x_a$ is shown for better illustration.

In accordance with some embodiments, the determination of the anonymized time and the anonymized location can be carried out by a random generator of the controller 18, the random generator being able to randomly generate a value from a uniform distribution of location values. For this purpose, for example, the predetermined distance 20 can be divided into spatial regions of, for example, a size of one square meter, from which the anonymized location $x_a$ can be generated with an evenly distributed probability. By way of a non-limiting example, the predetermined time can be divided into time intervals, which can be in the range of seconds or minutes, for example, from which the random generator can generate a time interval for the anonymized time $t_a$ with the same probability.

An anonymization probability can then be calculated on the basis of the traffic density and the predetermined distance 20. For this purpose, statistical methods can be used, in particular the modeling of a Poisson distribution, which can indicate the probability that the sensor data 16 can originate from at least two vehicles that are within the predetermined distance 20. By way of a non-limiting example, the anonymization probability can also be determined for the traffic density and the predetermined time.

The anonymization probability obtained in this way can then be compared by the controller 18 with a predetermined anonymization condition in order to determine whether the anonymization condition is met. The anonymization condition can be, for example, a predetermined threshold value which, given a specific expected value of the Poisson distribution, indicates a probability of, for example, over 99.9% that more than two vehicles may have transmitted the sensor data 16.

If the anonymization condition is met, the motor vehicle 12, in particular a transmission unit of the motor vehicle 12, which can transmit data via mobile radio, W-LAN, or Bluetooth, for example, can transmit the sensor data 16 to an external receiving unit 22. The values of the measurement time indication and/or the measurement location indication in the sensor data 16 are replaced by the anonymized time $t_a$ and the anonymized location $x_a$ before the transmission thereof.

The external receiving unit 22 can receive the sensor data 16 and remove the transmission information necessary for the transmission, such as a vehicle identification number and/or an IP address from the sensor data 16. In addition, the external receiving unit 22 can withhold the sensor data 16 before further processing and initially determine whether at least two sets of sensor data for the environment around the traffic sign 14 have arrived. In this case, the sensor data 16 can be buffered, for example, for a predetermined period of time and the external receiving unit 22 can wait to see whether further sensor data are received within this predetermined period of time. The predetermined time period can be, for example, a time period in the range of minutes or hours. If no further sensor data arrives within this time period, the external receiving unit 22 can discard the sensor data 16. However, if further sensor data are received, the at least two sets of sensor data can be provided for further processing. Further processing of the sensor data 16 can be carried out, for example, by an external service provider, since the latter can no longer draw any conclusions about the vehicle 12 after the sensor data 16 has been anonymized by the method shown.

FIG. 2a is a schematic representation of a determination of an anonymization probability according to an embodiment with an anonymized time. In FIG. 2a, it is schematically illustrated how an anonymization probability can be implemented with an anonymized time $t_a$. At a measurement location $x_0$, a vehicle 12 can record sensor data 16 at a measurement time $t_0$. The measurement time can be randomly replaced by an anonymized time $t_a$ within the sensor data 16, the anonymized time $t_a$ being able to be generated randomly within a predetermined time 21. Within this predetermined time 21, a number of vehicles at the measurement location $x_0$ can be modeled with the aid of the traffic density, which vehicles are expected within the predetermined time 21. Modeling using a Poisson process can then show that with an expected value of greater than or equal to ten vehicles, over 99.9% of more than two vehicles were present within the time interval, and the sensor data 16 could therefore also come from another vehicle 13.

FIG. 2b is a schematic representation of a determination of an anonymization probability according to the embodiment of FIG. 2a with an additionally anonymized location. In FIG. 2b, the same situation is shown as in FIG. 2a, but in this case the interval of the predetermined time 21 is additionally extended by an interval of the predetermined distance 20. This random location inaccuracy can extend the time interval of the predetermined time 21. For example, the average length of stay in the environment of the measurement location $x_0$ of vehicles entering the environment of the measurement location before the start of the predetermined time 21 can also be taken into account. This means that given a known speed of the vehicles that are located within the predetermined distance 20, it can be determined how many vehicles will still drive in the interval of the predetermined time 21. In this way, a higher level of accuracy can be achieved when modeling the anonymization probability.

Figure 3:
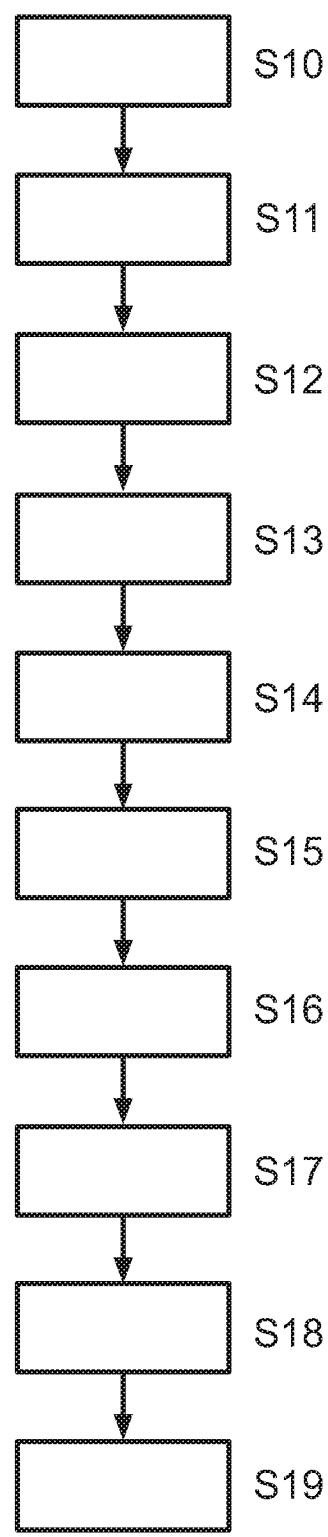
FIG. 3 is a schematic method diagram according to an embodiment.

FIG. 3 shows a schematic method diagram of an embodiment. In a step S10, sensor data 16 are determined at a measurement location $x_0$ of the vehicle 12 at a measurement time $t_0$.

In a step S11, a traffic density is determined in the environment of the measurement location $x_0$.

In a step S12, an anonymized time $t_a$ is determined which lies within a predetermined time 21 around the measurement time $t_0$, and/or an anonymized location $x_a$ is determined which lies within a predetermined distance 20 around the measurement location $x_0$.

In a step S13, an anonymization probability of the vehicle 12 is calculated on the basis of the traffic density and the predetermined time 21, and/or the anonymization probability is calculated on the basis of the traffic density and the predetermined distance 20.

In a step S14 it is determined whether the anonymization probability meets a predetermined anonymization condition, and if this anonymization condition is met, the sensor data 16 are transmitted to an external receiving unit 22 in a step S15, wherein the anonymized time $t_a$ and/or the anonymized location $x_a$ are transmitted as a measurement time indication and/or a measurement location indication of the sensor data 16.

In a step S16, the sensor data 16 can be received by the external receiving unit 22 which, in a step S17, can remove transmission information from the sensor data 16 that allows conclusions to be drawn about a sender.

The external receiving unit 22 can further determine in a step S18 whether at least two sets of sensor data are available for the environment and, if this is the case, provide the two sets of sensor data for further use in a step S19.

In accordance with some embodiments, a position alienating means to determine an anonymized location $x_a$ and a falsifier for time stamps to determine an anonymized time $t_a$ are provided and implemented in a vehicle 12 in order to be able to secure these functions. The external receiving unit 22 outside the vehicle 12 only accepts the transmitted sensor data 16 for a measurement when a second measurement is available for this in order to avoid an unambiguous assignment to a sender. Additional measures of the external receiving unit 22 can prevent an identification of the vehicle when transmitting the sensor data 16 as well as an unwanted linking of measurement location indications to a continuous profile by removing transmission information that allows drawing a conclusion about the sender.

Overall, the present disclosure provides a method for ensuring anonymity in location and time in the vehicle.

The invention claimed is:

1. A method for anonymized transmission of sensor data of a vehicle to a vehicle-external receiving unit, wherein the sensor data is transmitted with a measurement time indication or with a measurement location indication, the method comprising:
    determining the sensor data at a measurement location of the vehicle at a measurement time;
    determining a traffic density in an environment of the measurement location;
    determining an anonymized time or an anonymized location, wherein the anonymized time lies within a predetermined time duration of the measurement time, and wherein the anonymized location lies within a predetermined distance from the measurement location;
    calculating, using a statistical method, an anonymization probability of the vehicle based on the traffic density and the predetermined time duration and/or based on the traffic density and the predetermined distance, wherein the anonymization probability indicates probability of the sensor data being originated from at least two vehicles that are within the predetermined distance or the predetermined time duration;
    determining whether the anonymization probability meets a predetermined anonymization condition, wherein the predetermined anonymization condition indicates a predetermined number of vehicles present as potential senders of sensor data; and
    in response to determining that the predetermined anonymization condition is met, transmitting the sensor data to the vehicle-external receiving unit, wherein the anonymized time is indicated as a measurement time indication or the anonymized location is indicated as a measurement location indication.

2. The method of claim 1, wherein the determining the anonymized time further comprises determining the anonymized time using a random generator, wherein the random generator generates a value by means of a uniform distribution which lies within the predetermined time duration.

3. The method of claim 1, wherein the determining the anonymized location further comprises determining the anonymized location using a random generator, wherein the random generator generates a value by means of a uniform distribution which lies within the predetermined distance.

4. The method of claim 1, further comprising:
    determining the anonymization condition being met in response to the anonymization probability of the sensor data having originated from another vehicle compared to the anonymization probability of the sensor data having originated from the vehicle being greater than a threshold value.

5. The method of claim 1, wherein the calculating the anonymization probability of the vehicle further comprises calculating the anonymization probability using a Poisson distribution.

6. The method of claim 1, further comprising:
    selecting the predetermined time duration or the predetermined distance according to the sensor or a data type of the sensor data.

7. The method of claim 1, further comprising:
    removing transmission information from the sensor data received at the vehicle-external receiving unit.

8. The method of claim 7, further comprising:
    determining, by the vehicle-external receiving unit, whether there are at least two sets of sensor data for the environment;
    upon determining that there are at least two sets of sensor data for the environment, providing the at least two sets of sensor data for further processing by an external service provider.

9. An anonymizing system for anonymized transmission of sensor data to a vehicle-external receiving unit, the anonymizing system comprising:
    the vehicle-external receiving unit; and
    a vehicle of a plurality of vehicles, wherein the vehicle is configured to:
        determine the sensor data at a measurement location of the vehicle at a measurement time,
        determine a traffic density in an environment of the measurement location,
        determine an anonymized time or an anonymized location, wherein the anonymized time lies within a predetermined time duration of the measurement time, and wherein the anonymized location lies within a predetermined distance from the measurement location,
        calculate, using a statistical method, an anonymization probability of the vehicle based on the traffic density and the predetermined time duration and/or based on the traffic density and the predetermined distance, wherein the anonymization probability indicates probability of the sensor data being originated from at least two vehicles that are within the predetermined distance or the predetermined time duration, determine whether the anonymization probability meets a predetermined anonymization condition, wherein the predetermined anonymization condition indicates a predetermined number of vehicles present as potential senders of sensor data, and in response to determining that the predetermined anonymization condition is met, transmit the sensor data to the vehicle-external receiving unit, wherein the anonymized time is indicated as a measurement time indication or the anonymized location is indicated as a measurement location indication.

10. A motor vehicle, comprising:

a controller; and a sensor, wherein the controller is configured to:

determine sensor data collected by the sensor at a measurement location of the motor vehicle at a measurement time, determine a traffic density in an environment of the measurement location, determine an anonymized time or an anonymized location, wherein the anonymized time lies within a predetermined time duration of the measurement time, and wherein the anonymized location lies within a predetermined distance from the measurement location, calculate, using a statistical method, an anonymization probability of the motor vehicle based on the traffic density and the predetermined time duration and/or based on the traffic density and the predetermined distance, wherein the anonymization probability indicates probability of the sensor data being originated from at least two vehicles that are within the predetermined distance or the predetermined time duration, determine whether the anonymization probability meets a predetermined anonymization condition, wherein the predetermined anonymization condition indicates a predetermined number of vehicles present as potential senders of sensor data, and in response to determining that the predetermined anonymization condition is met, transmit the sensor data to a vehicle-external receiving unit, wherein the anonymized time is indicated as a measurement time indication or the anonymized location is indicated as a measurement location indication.

* * * * *